United States Patent
Roth et al.

(10) Patent No.: US 12,497,350 B2
(45) Date of Patent: Dec. 16, 2025

(54) PREPARATION OF A LYSINATE COMPOUND FROM AN AQUEOUS LYSINE SOLUTION

(71) Applicant: PHYTOBIOTICS Futterzusatzstoffe GmbH, Eltville (DE)

(72) Inventors: Hermann Roth, Eltville (DE); Yvonne Link, Destrich-Winkel (DE); Juliane Dohms, Eltville (DE)

(73) Assignee: PHYTOBIOTICS Futterzusatzstoffe GmbH, Eltville (DE)

( * ) Notice: Subject to any disclaimer, the term of this patent is extended or adjusted under 35 U.S.C. 154(b) by 725 days.

(21) Appl. No.: 17/415,271

(22) PCT Filed: Dec. 10, 2019

(86) PCT No.: PCT/EP2019/084346
§ 371 (c)(1),
(2) Date: Jun. 17, 2021

(87) PCT Pub. No.: WO2020/126647
PCT Pub. Date: Jun. 25, 2020

(65) Prior Publication Data
US 2022/0024856 A1    Jan. 27, 2022

(30) Foreign Application Priority Data
Dec. 18, 2018 (EP) .................... 18213331

(51) Int. Cl.
*C07C 229/76* (2006.01)
*C07C 227/18* (2006.01)

(52) U.S. Cl.
CPC .......... *C07C 229/76* (2013.01); *C07C 227/18* (2013.01)

(58) Field of Classification Search
None
See application file for complete search history.

(56) References Cited

U.S. PATENT DOCUMENTS

| 4,948,594 | A | 8/1990 | Abdel-Monem et al. |
| 5,061,815 | A | 10/1991 | Leu |

(Continued)

FOREIGN PATENT DOCUMENTS

| CN | 1068811 A | 2/1993 |
| CN | 101139299 A | 3/2008 |

(Continued)

OTHER PUBLICATIONS

National Center for Biotechnology Information (2024). PubChem Compound Summary for CID 23676116, I-Lysine sodium salt. Retrieved Jan. 3, 2024 from https://pubchem.ncbi.nlm.nih.gov/compound/l-Lysine-sodium-salt, first published in 2008 (Year: 2008).*

(Continued)

*Primary Examiner* — Amy C Bonaparte
(74) *Attorney, Agent, or Firm* — Harness, Dickey & Pierce, P.L.C.

(57) ABSTRACT

The invention relates to a process for preparing a monolysinate compound (200, 300, 400, 500, 600, 700, 800, 900). The process comprises providing (502) a liquid reaction mixture (810), in which lysine (802) and a metal salt (404) are dissolved; reacting the lysine dissolved in the reaction mixture and the metal salt to form the monolysinate compound; and drying the liquid reaction mixture in order to obtain the monolysinate compound.

13 Claims, 11 Drawing Sheets

(56) References Cited

U.S. PATENT DOCUMENTS

| | | |
|---|---|---|
| 6,670,494 B1 | 12/2003 | Trusovs |
| 2004/0137108 A1 | 7/2004 | Abdel-Monem et al. |
| 2010/0056817 A1 | 3/2010 | Meunier et al. |
| 2012/0225161 A1 | 9/2012 | Stark |
| 2018/0162803 A1 | 6/2018 | Hume et al. |

FOREIGN PATENT DOCUMENTS

| | | | |
|---|---|---|---|
| CN | 101172956 | A | 5/2008 |
| CN | 104739816 | A | 7/2015 |
| DE | 102011011924 | B4 | 12/2012 |
| EP | 1529775 | A1 | 5/2005 |
| JP | H02-184689 | A | 7/1990 |
| JP | H11-292761 | A | 10/1999 |
| JP | 2006-513248 | A | 4/2006 |
| JP | 2014-506800 | A | 3/2014 |

OTHER PUBLICATIONS

National Center for Biotechnology Information (2024). PubChem Element Summary for AtomicNumber 11, Sodium. Retrieved Apr. 2, 2024 from https://pubchem.ncbi.nlm.nih.gov/element/Sodium (Year: 2024).*
National Center for Biotechnology Information (2024). PubChem Compound Summary for CID 24436, Sodium Sulfate. Retrieved Apr. 2, 2024 from https://pubchem.ncbi.nlm.nih.gov/compound/Sodium-Sulfate. (Year: 2024).*
https://ecampusontario.pressbooks.pub/bioc2580/chapter/bioc2580-lecture-2-amino-acid-properties-polarity-and-ionization/, downloaded on Apr. 18, 2024, first published in 2021 (Year: 2024).*
Nolting ("pH-Induced Protonation of Lysine in Aqueous Solution Causes Chemical Shifts in X-ray Photoelectron Spectroscopy" J. Am. Chem. Soc. 2007, 129, p. 14068-14073); (Year: 2007).*
Manganese Sulfate Monohydrate (downloaded from https://www.chemicalbook.com/ChemicalProductProperty_EN_CB5776117.htm on Apr. 19, 2024) (Year: 2024).*
Ferrous Sulfate (downloaded from https://www.ncbi.nlm.nih.gov/books/NBK216452/?report=printable on Apr. 18, 2024) (Year: 2024).*
Zinc Sulfate Heptahydrate (downloaded from https://pubs.acs.org/doi/10.1021/acsreagents.4429 on Apr. 18, 2024) (Year: 2024).*
Copper Sulfate (downloaded from https://www.ul.com/sites/g/files/qbfpbp251/files/2020-08/Acquiring_Copper_Sulfate_Solution_3.0.pdf on Apr. 18, 2024) (Year: 2024).*
PH and Water (downloaded from https://www.usgs.gov/special-topics/water-science-school/science/ph-and-water on Apr. 18, 2024) (Year: 2024).*
"Chlorides in Fresh Water" (https://web.uri.edu/wp-content/uploads/sites/1667/Chlorides.pdf, dated Mar. 4, 2012, downloaded on Aug. 28, 2024) (Year: 2012).*
"CDC Drinking Water" ( https://www.cdc.gov/healthywater/drinking/public/water_disinfection.html#print, dated Nov. 17, 2020, downloaded on Aug. 28, 2024) (Year: 2020).*
International Preliminary Report on Patentability for PCT/EP2019/084346 dated Jul. 1, 2021.
Office Action for Chinese Application No. 201980083696.X dated Jul. 27, 2023.
English-language translation of Japanese Office Action dated Oct. 6, 2023 for corresponding Japanese Patent Application 2021-535175.
International Search Report PCT/ISA/210 and Written Opinion PCT/ISA/237 for International Application No. PCT/EP2019/084346 dated Dec. 10, 2019.
Observations for European Application No. 18213331.4 dated May 19, 2021.
http://www1.biologie.uni-hamburg.de/bonline/library/newton/Chy251 253/Lectures/ Amino Acids/ AminoAcids.html#:~text=Lysine%20contains%20a%20carboxylic%20acid,o:f0/o20these%20groups%20are%20protonated.&text=This%20means%20that%20when%20the,in%20lysine%20wil1%20be%20deprotonated. downloaded Jun. 5, 2021.
Conato et al., "Copper(II) complexes with L-lysine and L-ornithine: is the side-chain involved in the coordination? A thermodynamic and spectroscopic study," Thermochimica Acta, 362 (2000), pp. 13-23.
Office Action dated Jul. 2, 2024 issued in Japanese patent application No. 2021-535175.
Office Action dated Oct. 8, 2024 issued in European patent application No. 19813588.1.
Office Action dated Oct. 22, 2024 issued in Korean patent application No. 10-2021-7019031.
Rejection Letter issued Jun. 2, 2025 in Korean Application No. 10-2021-7019031.

* cited by examiner

Lysinate - monovalent metal - divalent anion

Manganese lysinate granules

Manganese lysinate granules

Manganese lysinate

PREPARATION OF A LYSINATE COMPOUND FROM AN AQUEOUS LYSINE SOLUTION

CROSS-REFERENCE TO RELATED APPLICATIONS

This application is a national phase under 35 U.S.C. § 371 of PCT International Application No. PCT/EP2019/084346 which has an International filing date of Dec. 10, 2019, which claims priority to EP Application Serial No. 18213331.4, filed Dec. 18, 2018, the entire contents of each of which are hereby incorporated by reference.

TECHNICAL FIELD

The invention relates to a process for producing amino acid/metal salt compounds, in particular monolysinate compounds, and to the use thereof.

PRIOR ART

When metal compounds are reacted with amino acids, chelates or salt compounds are formed. Amino acid chelate compounds are used inter alia in animal feed to provide trace elements. The amino acid chelate compounds currently available on the market differ from each other in respect of the trace element content, the stoichiometric amino acid/metal ratio, the solubility in water, the color and structure, the pH, and the quantity and type of residues resulting from the preparation process. In particular, the abrasion of material from mills, which are used to mechanically activate the reactants, and/or inorganic anions (in particular chlorides), which may be contained in the starting materials for the reaction, are an undesired source of impurities.

EP 1 529 775 B1 describes a process for preparing chelates of metals with organic acids, which is carried out substantially in an anhydrous medium. However, the described preparation process requires a laborious pretreatment of the metal compounds used.

The patent DE 10 2011 011 924 B4 describes a process for preparing amino acid chelate compounds, according to which metal oxides, metal carbonates, metal sulfates, metal chlorides and/or metal hydroxides in solid form are mechanically activated by impact and pressure and then the activated metal oxides/metal carbonates/metal hydroxides/metal sulfates and/or metal chlorides are brought together with amino acids in solid form and are reacted in a solid-state reaction to form amino acid chelate compounds. The patent applications CN 92107282.1 and CN 2007/130121.0 describe the use of a ball mill for mechanically activating and reacting mixtures of copper acetate and glycine to produce glycine chelates. However, one disadvantage of using ball mills and other mills (for example vibrating mill, agitator ball mill, drum mill) is that, due to the considerable mechanical stress on the mill, material is abraded therefrom and remains as an impurity in the amino acid chelate and has to be removed therefrom, which may require some effort. In addition, there are also problems with the process since the reactants tend to adhere to solid surfaces (of the mills) and thus impair the reaction.

In addition, many of the described processes for preparing amino acid chelate compounds relate to the amino acid glycine, not lysine. Lysine is an essential amino acid which cannot be produced by humans and other mammals themselves. Lysine is one of the most important building blocks of connective tissue, especially collagen. A lack of lysine therefore leads to weak connective tissue. However, known processes for producing glycine chelates cannot simply be transferred to lysine, since glycine is the smallest and simplest of the naturally occurring amino acids, whereas lysine has a long, chain-like amino acid residue. This difference in size has considerable steric effects on the chelate lattice structure and thus also the type of chelate compounds that the respective amino acids can form, and also affects the required reaction conditions. The preparation processes described for glycine therefore cannot be transferred to lysine.

Technical Problem and Basic Solutions

The problem addressed by the invention is therefore that of providing an alternative and/or improved process for preparing amino acid/metal compounds for the amino acid lysine, as well as a corresponding compound.

The problems addressed by the invention are respectively solved by the features of the independent claims. Embodiments of the invention are specified in the dependent claims. The embodiments and examples listed below can be freely combined with one another, provided they are not mutually exclusive.

In one aspect, the invention relates to a process for preparing a monolysinate compound. The process comprises:
  providing a liquid reaction mixture, in which lysine and a metal salt are dissolved;
  reacting the lysine dissolved in the reaction mixture and the metal salt to form the monolysinate compound;
  drying the liquid reaction mixture in order to obtain the monolysinate compound.

Preparing monolysinate compounds from a liquid (in particular aqueous) lysine solution may be advantageous since the monolysinate produced in this process has a high purity. According to embodiments of the invention, the monolysinate compound obtained is substantially or entirely free of various residues which usually contaminate the product when using the preparation processes known in the prior art.

By way of example, it has been observed that the lysine sulfate available on the market (EU feed ingredient approval number: 3.2.5), which is obtained in a fermentation process and which is theoretically also available as a starting material for the chemical synthesis of monolysinates, has a high level of impurities originating from fermentation by-products. These impurities may in some cases participate in the formation of a compound from lysine and metal salt to give a chelate or a salt, wherein the type and quantity of the "impurity compounds" thus formed can be neither predicted nor reliably avoided. Removal of these undefined compounds from the end product is possible only to a limited extent, if at all.

In contrast, according to embodiments of the invention, the liquid reaction mixture is produced by respectively dissolving lysine, in the form of the pure substance, and the metal salt in water, wherein the lysine may be brought into solution before, during or after the metal salt is brought into solution. According to preferred embodiments, an aqueous lysine solution, which does not yet contain the metal salt involved in producing the compound, is provided in ready-made form and is obtained for example from commercial distributors on the market. The metal salt is then dissolved in this aqueous lysine solution in order to prepare the liquid reaction mixture.

The processes known in the prior art for preparing amino acid chelates or amino acid salts are in some cases carried out at high pressures or high temperatures. However, lysine is a very sensitive amino acid which often cannot be processed under these extreme conditions, or not without being destroyed. In contrast, embodiments of the invention provide a comparatively gentle preparation process, which is suitable even for chemically sensitive amino acids such as lysine.

According to embodiments of the invention, the process therefore comprises providing an aqueous lysine solution. The liquid reaction mixture is produced by dissolving the metal salt in the aqueous lysine solution.

Aqueous lysine solutions ("liquid lysine") currently available on the market, which have been obtained by bringing lysine into solution in water, do not have the impurities associated with preparing lysine in fermenters since these are produced in a different process and/or any residues have been removed in the course of the preparation process. By way of example, the lysine solution may be a commercially available solution of pure or purified lysine, which is substantially or entirely free of other substances. The aqueous lysine solution used to produce the monolysinate compound is therefore in particular a pure solution of lysine in water, which is largely or entirely free of other substances and impurities and in particular is free of fermentation residues. Monolysinate compounds prepared according to embodiments of the invention from the currently commercially available aqueous lysine solutions therefore have a significantly higher degree of purity than corresponding chelate compounds produced from lysine sulfates from a fermentation and/or by means of mechanical activation.

Apart from this, commercially available lysine sulfate compounds are significantly more expensive (based on the quantity of lysine) than the "liquid lysine" currently available on the market. The latter is commercially available on the market as an aqueous lysine solution having a lysine content of approximately 50% by weight (the remainder is water), for example under the trade name "BestAmino™ L-Lysine Liquid Feed Grade" from the company CJ CHE-IUEDANG BIO. An aqueous lysine solution having a lysine content of 30-40% has a pH in the range of approximately 9-11 at 20° C.

Lysine is also available on the market in the form of L-lysine monohydrochloride, or "Lysine-HCl" for short (EU feed ingredient approval number: 3.2.3). However, the applicant has found that lysine-HCl can corrode the machines and equipment used to process it, if these are made of metal or have metal components. A strong corrosive effect can be observed in particular when lysine-HCl compounds are activated thermally, mechanically and/or wet-chemically. This causes not only increased wear on the materials, corrosion damage to containers and machines, and thus increased production costs, but also introduces rust and other corrosion-related impurities, in particular heavy metals, into the reaction product. The preparation process according to the invention thus makes it possible to prepare particularly pure monolysinate compounds, and to do so with lower production costs and less wear on materials due to corrosion.

In another advantageous aspect, aqueous lysine solutions have a basic pH, so that corrosion damage to the machines and equipment is avoided during the process for preparing the monolysinate compound.

According to embodiments of the invention, the liquid reaction mixture is produced in a metal container, in which the starting materials of the reaction mixture are also reacted to form the final monolysinate compound. As an alternative to this, a plurality of metal containers may also be used to produce the reaction mixture and to carry out the chemical reaction, and/or metal equipment, for example stirrers, mixers or the like, may be used. This may be advantageous because many reactors and containers available on the market for carrying out and monitoring chemical reactions are made of metal. These standard containers can be used without having to expect premature failure of said containers or equipment since the aqueous lysine solution, on account of its alkaline pH and/or on account of the absence of chlorides (salts of hydrochloric acid), does not corrode these metal objects.

According to embodiments of the invention, the lysine described here is in particular L-lysine (CAS No. 56-87-1), which is dissolved in water. Lysine has the empirical formula $C_6H_{14}N_2O_2$ and a molecular weight of 146.19 g/mol.

According to embodiments of the invention, the monolysinate compound is a compound having a structural formula as shown in one of FIGS. 2-9, where M in FIGS. 2, 4, 6 and 8 represents a metal cation of the metal salt and A represents the anion of the metal salt.

According to embodiments of the invention, in the monolysinate compound, exactly one lysine molecule in the form of an anion is bonded via an ionic bond to exactly one metal atom of the metal salt in the form of a monovalent or divalent cation.

According to embodiments of the invention, the monolysinate compound is a monolysinate hydrate, that is to say a monolysinate compound which contains at least one water molecule.

According to embodiments of the invention, the metal salt is a metal sulfate, a metal hydroxide or a metal carbonate.

Compared to other salts, in particular metal chlorides, the aforementioned metal salts have the advantage that they do not bring about any, or only a slight, increase in the rate of corrosion of metal objects that come into contact with the liquid reaction mixture.

According to one embodiment, the metal salt is a metal chloride. Although this embodiment can also be used to prepare the monolysinate compound, the use of metal chlorides is not preferred due to the increased tendency for metal equipment to corrode in such a reaction solution.

According to embodiments of the invention, the metal of the metal salt is a monovalent or divalent metal, in particular manganese $Mn^{2+}$, iron $Fe^{2+}$, zinc $Zn^{2+}$, copper $Cu^{2+}$, calcium $Ca^{2+}$, magnesium $Mg^{2+}$, sodium $Na^+$, cobalt $Co^{2+}$, potassium $K^+$ or nickel $Ni^{2+}$. The metal salt may in particular be a metal sulfate.

According to embodiments of the invention, the monolysinate compound is a monolysinate salt. Each monomeric unit of the salt lattice therefore has exactly one lysine molecule and preferably exactly one metal atom (of the metal salt).

According to embodiments of the invention, the monolysinate compound is a monomeric monolysinate salt, or a polymeric monolysinate salt, or a mixture of monomeric and polymeric monolysinate salt.

According to embodiments of the invention, the metal salt used is a salt of a) one divalent metal atom and one divalent anion, or b) one divalent metal atom and two monovalent anions, or c) two monovalent metal atoms and one divalent anion, or d) one monovalent metal atom and one monovalent anion.

According to embodiments of the invention, the monolysinate compound is a manganese monolysinate sulfate or an iron monolysinate sulfate.

According to particularly preferred embodiments of the invention, the metal salt is a zinc sulfate ($ZnSO_4$), iron sulfate ($FeSO_4$) or manganese sulfate ($MnSO_4$). However, it may also be a copper sulfate ($CuSO_4$), calcium sulfate ($CaSO_4$), magnesium sulfate ($MnSO_4$), cobalt sulfate ($CoSO_4$), sodium sulfate ($Na_2SO_4$) or nickel sulfate ($NiSO_4$).

According to embodiments of the invention, the liquid reaction mixture is produced by dissolving a metal salt in the aqueous lysine solution in a molar ratio of 1 mol of a metal atom of the metal salt to 1 mol of the lysine.

The respective weight ratios of metal salt and lysine in the reaction mixture depend on the metal or metal salt used in each case. It was observed in tests that a liquid reaction mixture having a molar ratio of lysine:metal atom that deviated significantly from the abovementioned 1:1 ratio nevertheless formed substantially structurally pure products according to the formulae in FIG. 2, 4, 6 or 8, although in this case residues of unreacted metal salt components possibly then remained in the reaction mixture. According to embodiments of the invention, the process according to the invention may therefore be advantageous since it is robust against fluctuations in the molar ratio of lysine and metal or metal salt. However, the liquid reaction mixture is preferably produced in such a way that lysine and metal atom are present in a molar ratio of 1:1 in order to ensure that as far as possible all the starting materials, at least all the metal atoms of the metal salt, are reacted to form the desired product, said monolysinate compound.

According to embodiments of the invention, the chemical reaction process comprises mechanically mixing the dissolved lysine and the dissolved metal salt at a temperature of at least 60° C., preferably 60° C.-90° C., for at least 15 minutes. By way of example, the liquid reaction mixture may be stirred for at least 20 minutes, in particular approximately 25-35 minutes, at a temperature of approximately 80° C. It has been observed that a stirring duration of less than 60 minutes, and even of less than 50 minutes, and even of less than 40 minutes is usually sufficient to fully or almost fully react all the starting materials in the liquid reaction mixture to form the monolysinate compound.

According to embodiments of the invention, the provided aqueous lysine solution has a lysine content of at least 30% by weight, preferably at least 40% by weight of the aqueous solution. The remainder of the aqueous lysine solution consists substantially or entirely of water. By way of example, an aqueous solution having a 50% lysine content can be obtained commercially. This aqueous solution can then be further diluted by adding water to facilitate the spraying of the fully reacted liquid reaction mixture in a subsequent spray drying process and/or the dissolution of the metal salt in the aqueous lysine solution. The additional water, if necessary at all, is preferably added to the provided aqueous lysine solution before the metal salt is dissolved in the aqueous lysine solution. However, it is also possible to add the additional water together with or only after the metal salt.

The question as to whether and, if so, how much water must be added depends on the selected drying process, the concentration of the liquid lysine solution in question, and the type of metal salt to be dissolved therein. However, simple experimental manipulations are entirely sufficient in order to answer this question. If, for example, the calculated quantity of metal salt has not fully dissolved in the aqueous lysine solution even after stirring for 15 minutes at temperatures above 60° C., a small quantity of water can be repeatedly added until the metal salt has fully dissolved. The quantity of water added is noted and can be measured and added to the aqueous lysine solution or the reaction mixture from the beginning in subsequent preparation processes using the same type of aqueous lysine solution and the same type of metal salt. If an atomization process is used to dry the fully reacted reaction mixture, and if it is found during this that the reaction mixture is too viscous for the nozzles used so that mist formation does not occur or is insufficient, additional water can be added to the aqueous lysine solution or the reaction mixture in subsequent preparation processes using the same type of aqueous lysine solution and the same type of metal salt. If the atomization process then proceeds as desired, the additional quantity of water is noted and will in future always be added to the lysine solution or the reaction mixture when repeating the preparation process. If the atomization process still does not function correctly due to an excessively high viscosity of the reaction mixture, the additional quantity of water will be further increased when the process is next carried out. The chemical reaction, together with the subsequent atomization, will be repeated and the quantity of water adjusted if necessary, as often as required, until the desired atomization effect is achieved.

In some embodiments, the provided aqueous lysine solution is already heated to above 60° C. before the metal salt is dissolved therein, since this may accelerate the process of dissolving the metal salt. However, it is also possible first to add the metal salt to the aqueous lysine solution in order to dissolve the metal salt therein, and to increase the temperature of this solution to above 60° C. after or during this dissolution process. The metal salt is preferably dissolved in the liquid lysine solution with constant stirring.

According to embodiments of the invention, the aqueous lysine solution and the liquid reaction mixture are substantially free of hydrochloric acid and salts thereof. In particular, the aqueous lysine solution and the liquid reaction mixture are substantially free of lysine-HCl salts and dissolution products thereof.

This may be advantageous since in particular $Cl^-$ ions, hydrochloric acid and salts thereof and/or lysine-HCl residues may cause corrosion of metal objects, such as for example metal reaction vessels or stirrers.

According to embodiments of the invention, the monolysinate compound contained in the liquid reaction mixture following the reaction is a compound according to a structural formula as shown in general or as a specific example in one of FIGS. 2-9. The liquid reaction mixture typically contains less than 1% monolysinate compounds having a different structural formula or a different molar ratio of lysine and metal atom.

According to embodiments of the invention, the process further comprises producing granules from the monolysinate compound after or during the drying.

In a further aspect, the invention relates to a monolysinate compound produced by a process for producing a monolysinate compound according to one of the embodiments and examples described here.

According to embodiments of the invention, the monolysinate compound has a structural formula as shown in one of FIGS. 2, 4, 6 and 8, where M represents the metal cation of the metal salt and A represents the anion of the metal salt. Specific examples of this are shown in each of FIGS. 3, 5, 7 and 9.

According to embodiments of the invention, the monolysinate compound is substantially or entirely free of chlorides and $Cl^-$ ions. Preferably, the fully reacted liquid reaction mixture and the dried reaction products obtained therefrom are substantially or entirely free of chlorides and chlorine ions. In particular, the powder or granules obtained in the drying and/or granulation process is/are substantially or entirely free of chlorides and chlorine ions.

According to embodiments of the invention, the monolysinate compound produced by the process described here contains water of crystallization. The quantity of water of crystallization typically lies in the range from 5 to at most 10% of the weight of the monolysinate compound. According to embodiments of the invention, the monolysinate compound is therefore a hydrate. This may be advantageous since hydrates are not very hygroscopic, if at all. In dried form, the monolysinate compound thus prepared therefore does not tend to absorb moisture from the ambient air and form clumps. The compound therefore remains free-flowing and thus can be stored for a long time and remains able to be processed.

According to embodiments, the water content of the aqueous reaction mixture is adjusted, for example by way of the water content of the aqueous lysine solution, such that the solids:water ratio is at least 2:1, the solids consisting of the sum of lysine and metal salt. In some embodiments, the solids content may be lowered for ease of processing and to facilitate solubility, for example as far as a ratio of 1:1.

If an iron salt is used as the metal salt, and if a small quantity of citric acid is added to the reaction mixture, the citric acid may account for 0.15%-0.25% of the solids mass, for example 0.2% of the solids mass.

The applicant has observed that embodiments of the process are robust against fluctuating concentrations of oxygen that may be dissolved in the aqueous lysine solution and/or in the liquid reaction mixture. This means that fluctuating oxygen concentrations in the solution have no significant effect on the composition of the monolysinate compound obtained. According to embodiments of the invention, the preparation process is therefore free of a step of boiling (heating above the boiling point) the aqueous lysine solution and/or the liquid reaction mixture (at least in the course of preparing the monolysinate compound, since it is possible that the manufacturer of the aqueous lysine solution boils the lysine solution in order to improve the shelf life).

The amino acid lysine has an isoelectric point of 9.74. According to embodiments of the invention, the liquid reaction mixture has a pH considerably below this isoelectric point, that is to say below 9.5, preferably below 8.5. The aqueous lysine solution may for example initially have a pH of approximately 10.2. When producing the liquid reaction mixture by dissolving the metal salt in the aqueous lysine solution, the pH of the resulting liquid reaction mixture becomes acidic, the pH being strongly dependent on the metal salt used.

The table below shows preferred mixing ratios of various components and the effect of various metal salts on the pH.

|  | MANGANESE | IRON | ZINC | COPPER |
| --- | --- | --- | --- | --- |
| Metal sulfate | 57 g | 58 g | 58 g | 82 g |
| Aqueous lysine solution | 168 g | 164 g | 164 g | 164 g |
| pH without metal sulfate | 10.2 | 10.3 | 10.2 | 10.2 |
| pH after adding metal sulfate | 8.11 | 6.62 | 5.75 | 3.85 |

To obtain this pH, it is not necessary (with the exception of some embodiments which use an iron salt as the metal salt) for an acid or a base to be additionally added to the liquid reaction mixture in order to adjust the pH so as to ensure that the desired reaction products are obtained. The addition of the metal salt is sufficient to lower the pH sufficiently. The applicant has observed that in almost all cases (except when adding some iron salts) it is not necessary to use additional acids to lower the pH, and attributes this observation to the rather high tendency of the amino acid lysine to form a monolysinate compound with a metal ion.

Instead, the process for preparing the monolysinate compound according to embodiments of the invention provides that the liquid reaction mixture is produced without adding (additional) acids, such as for example picolinic acid or formic acid. It was observed that the addition of acids is not only not necessary to bring the components described here into solution; it additionally appears to contribute to increasing the corrosiveness of the liquid reaction mixture. However, corrosion is to be avoided in order to minimize the introduction of heavy metals when using metal containers and equipment to prepare and process the reaction mixture. An organic acid, for example a citric acid, is preferably additionally added only when using iron salts, so as to keep the iron in the desired oxidation stage.

It may be advantageous to avoid adding acids since the addition of the further acids may lead to the monolysinate compound being contaminated with other reaction products, in particular chelates. According to embodiments of the invention, the preparation process is additionally free of a step of applying an electrical voltage to the liquid reaction mixture. The applicant has observed that the starting materials contained in the reaction mixture react quickly and effectively to form the monolysinate compound, even without applying an electrical voltage. In aqueous reaction systems, short-time electrical currents are sometimes used to accelerate the reaction. However, the application of electrical voltages on the one hand increases the energy consumption, and on the other hand, at least when high voltages are applied, gives rise to ions and/or radicals which may increase the corrosiveness of the liquid reaction mixture.

In a further aspect, the invention relates to a substance mixture which contains one or more monolysinate compounds according to embodiments of the invention. The substance mixture may be, for example, a feed or a feed additive for livestock and pets, a fermentation additive for composting or biogas plants, a plant fertilizer, a food, a food additive or a food supplement for humans.

In a further aspect, the invention relates to a use of a monolysinate compound according to one of the embodiments and examples described here as a feed additive for livestock and pets and/or as a fermentation additive and/or as a fertilizer additive and/or as a food additive and/or as a food supplement.

The use of the monolysinate compound in animal nutrition may bring about an increase in performance and an improved intestinal absorption of trace elements. The efficiency of trace elements in feed can be improved, and the excretion rate can be reduced. The risk of physiological undersupply and performance depression are reduced. In addition, organically bound trace elements appear to have physiological advantages, for example improved zootechnical and reproductive performance, higher egg quality, as well as higher incorporation of trace elements into body organs or tissue.

An "ionic bond" (also "salt bond", "heteropolar bond" or "electrovalent bond") is a chemical bond which results from the electrostatic attraction of positively and negatively charged ions. From an electronegativity difference of ΔEN=1.7, this is referred to as a 50% partially ionic character. If the difference is greater than 1.7, ionic bonds therefore exist, including polar, predominantly covalent bonds. However, the case of the pure ionic bond is an idealization. There is typically an ionic bond between elements that are on the left in the periodic table (PTE), i.e. metals, and elements that are on the right in the PTE, i.e. non-metals. If the ionic bond percentage of sodium chloride is considered for example, which is often viewed as a classic case of ionic bonding, a value of approximately 73% is calculated. The ionic character of cesium fluoride is approximately 92%.

Spectroscopic images have shown that the monolysinate compound according to embodiments of the invention is a monolysinate based on ionic bonds, not a complex compound with coordinative bonds or a chelate in the narrower sense.

A "monolysinate compound" is a compound formed of one or more monomers, wherein, in each monomer, exactly one lysine molecule is bonded via ionic bonds to exactly one metal salt or ionic components thereof.

A "chelate compound", also referred to as a "chelate complex" or "chelate", is a compound in which a multidentate ligand (also "chelator", has more than one free electron pair) occupies at least two coordination sites (binding sites) on the central atom. The central atom is preferably a doubly positively charged metal ion (for example Fe2+, Zn2+). The ligands and the central atom are linked by coordinative bonds. This means that the bonding electron pair is provided by the ligand alone. Chelate complexes are more stable than the same complexes with monodentate, non-linked ligands. The coordinative bond (complex bond) between the ligand and the metal can be regarded as a polar covalent bond and differs from other forms of chemical bond: unlike in the case of the coordinative bond, an ionic bond has no bonding electron pair. Unlike in the case of a coordinative bond, in a non-polar covalent bond each bonding partner contributes one electron to the bonding electron pair.

A substance which is "substantially free" of a certain substance will be understood below to mean a substance which consists of said substance in a proportion of less than 1%, preferably less than 0.4% of its weight or contains said substance in a proportion of less than 1%, preferably less than 0.4% of its weight.

An "aqueous lysine solution" will be understood here to mean water in which lysine is dissolved. According to preferred embodiments, the aqueous lysine solution is entirely or substantially free of other amino acids besides lysine. According to embodiments of the invention, the liquid reaction mixture is entirely or substantially free of chlorides and Cl⁻ ions.

A "liquid reaction mixture" will be understood here to mean an aqueous solution which contains the starting materials and/or products of this chemical reaction. Before the start of the chemical reaction, the reaction mixture contains substantially only the starting materials. Once all or at least the limiting starting materials have fully reacted to form one or more products, the reaction mixture contains the products and any starting materials remaining as a stoichiometric residue.

BRIEF DESCRIPTION OF THE FIGURES

Embodiments of the invention will be explained in greater detail below purely by way of example, reference being made to the drawings containing said embodiments. In the drawings.

DETAILED DESCRIPTION

Figure 1:
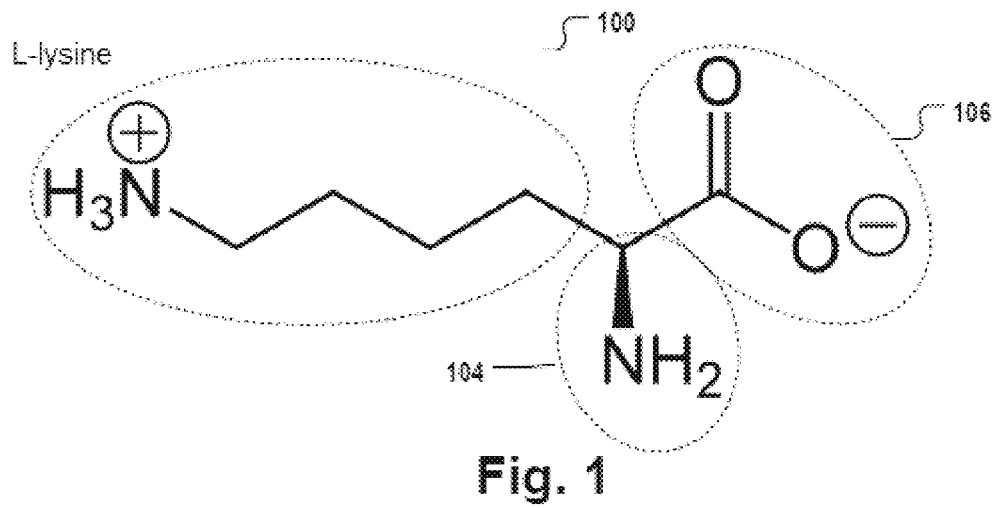
FIG. 1 shows a general structural formula of L-lysine.

FIG. 1 shows the essential proteinogenic α-amino acid lysine in its natural L-form. According to preferred embodiments of the invention, the "lysine" is to be understood as L-lysine. Lysine contains the groups characteristic of amino acids, namely an amino group 104, a carboxyl group 106, and the residue 102 typical of lysine. The carboxyl group may be negatively charged, so that the lysine is in the form of a lysine anion.

Figure 2:
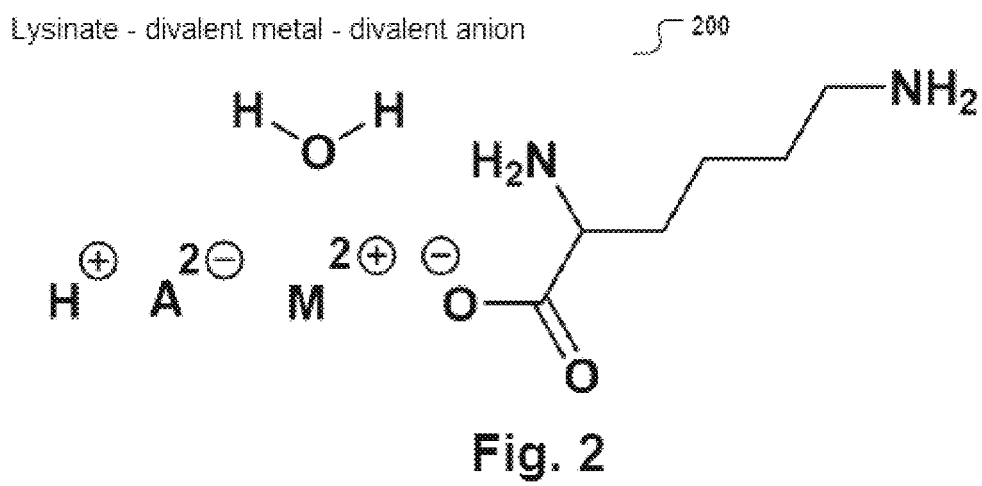
FIG. 2 shows a general structural formula of a monolysinate compound.

FIG. 2 shows a general structural formula of a monolysinate compound 200, as can be obtained according to embodiments of the preparation process described here.

The monolysinate compound 200 contains exactly one lysine molecule per metal atom. It is produced for example from an aqueous solution of lysine and a metal salt, the metal salt consisting of one divalent metal and one divalent anion.

The carboxyl group is negatively charged, so that the lysine is in the form of a lysine anion. The lysine anion is bonded to the metal cation of the dissolved metal salt via an ionic bond. In particular, in the ionic bond, the metal cation M is the link between the anion A of the metal salt and the lysine anion. In the embodiment shown in FIG. 2, the metal ion M is a doubly positively charged cation and the metal salt anion is a doubly negatively charged anion, one charge of which is saturated by a proton with a charge. The positively charged metal ion may in particular be $Mn^{2+}$, $Fe^{2+}$, $Zn^{2+}$, $Cu^{2+}$, $Ca^{2+}$, $Mg^{2+}$, $Co^{2+}$, $Na^+$ or $Ni^{2+}$. The anion may for example consist of a sulfate residue or carbonate residue.

Figure 3:
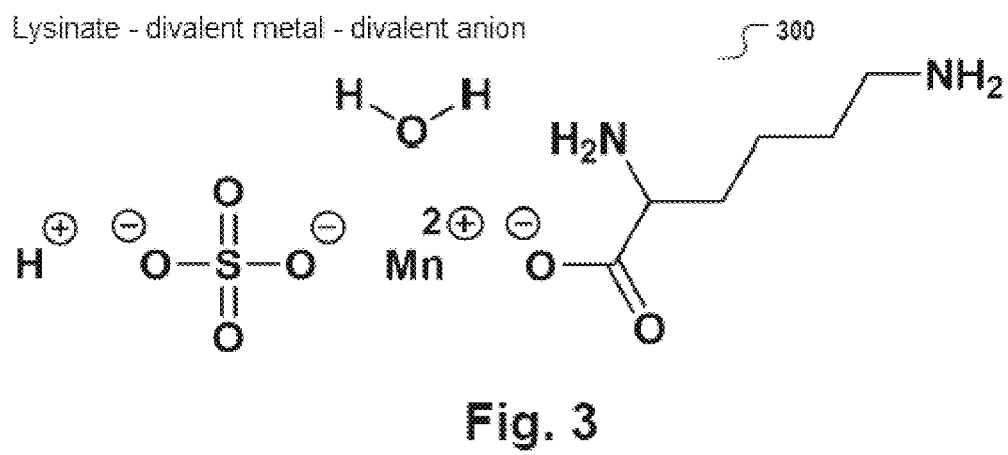
FIG. 3 shows a specific example of a monolysinate compound according to the general formula of FIG. 2.

FIG. 3 shows a specific example of a monolysinate compound according to the general formula of FIG. 2, namely a structural formula for manganese monolysinate sulfate 300. The monolysinate compound 200, 300 may contain water of crystallization (water of hydration).

Figure 4:
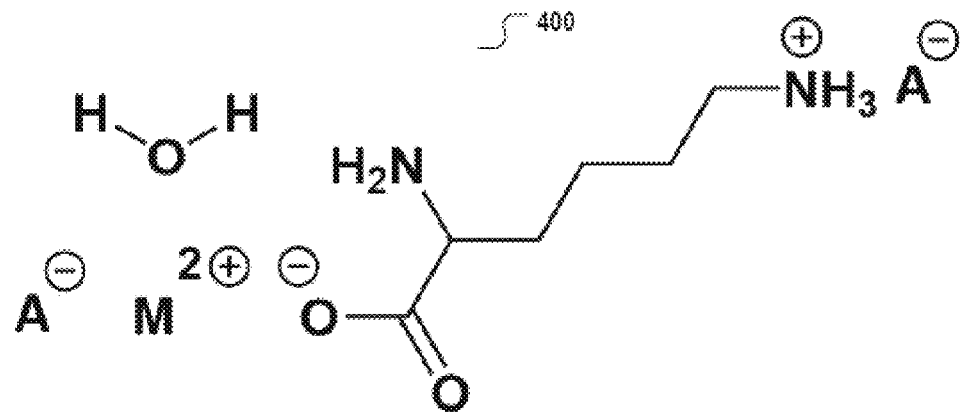
FIG. 4 shows a general structural formula of a further monolysinate compound.

FIG. 4 shows a general structural formula of a monolysinate compound 400, as can be obtained according to embodiments of the preparation process described here. The monolysinate compound 400 contains exactly one lysine molecule per metal atom. It is produced for example from an aqueous solution of lysine and a metal salt, the metal salt consisting of a divalent metal and two monovalent anions.

Figure 5:
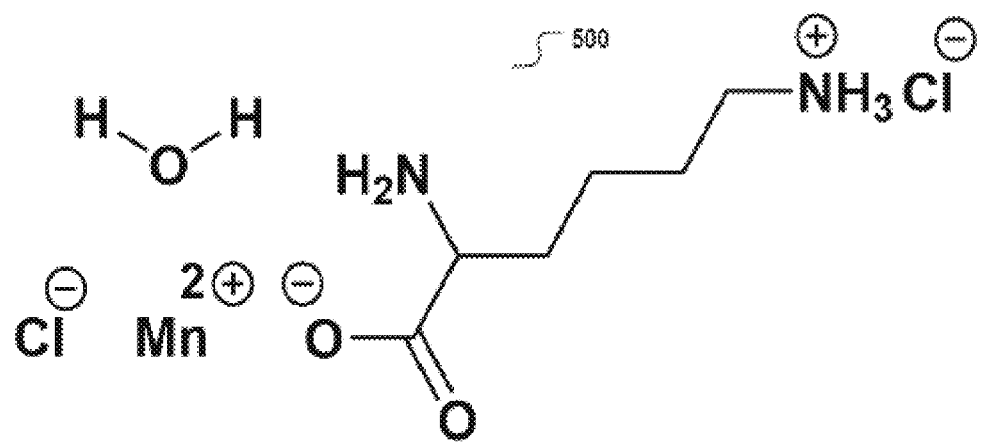
FIG. 5 shows a specific example of a monolysinate compound according to the general formula of FIG. 4.

FIG. 5 shows a specific example of a monolysinate compound according to the general formula of FIG. 4, namely a structural formula for manganese monolysinate chloride 500. The monolysinate compound may contain water of crystallization (water of hydration). The compound 500 may be obtained as a reaction product from liquid lysine and manganese chloride $MnCl_2$. One of the two chloride ions of the $MnCl_2$ salt attaches to the amine in the amino acid residue of the lysine, creating an ionic bond between the NH3+ group and the chloride anion. The other chloride ion attaches to the divalent manganese cation, creating an ionic bond between the metal cation and the chloride anion. Since the anions and cations of the $MnCl_2$ salt are in solution before the salt is formed, the two chloride ions may also originate from different $MnCl_2$ salt monomers. Due to the corrosive property of chlorides, this embodiment with chlorides as anions is possible, but not preferred.

Figure 6:
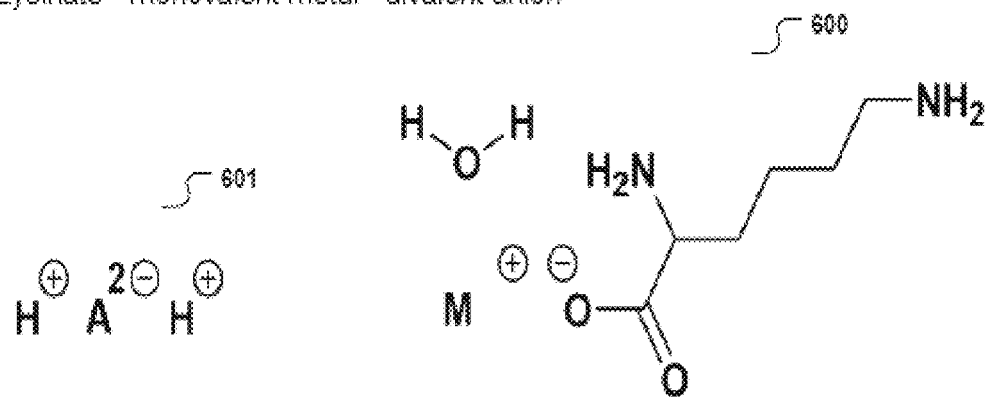
FIG. 6 shows a general structural formula of a further monolysinate compound.

FIG. 6 shows a general structural formula of a monolysinate compound 600, as can be obtained according to embodiments of the preparation process described here. The monolysinate compound 600 contains exactly one lysine molecule per metal atom. It is produced for example from an aqueous solution of lysine and a metal salt, the metal salt consisting of two monovalent metal atoms and one divalent anion (for example sulfate, carbonate). The compound 600, 700 may contain water of crystallization. The lysine molecule is bonded by its singly negatively charged carboxyl group to the singly positively charged metal ion via an ionic bond. The divalent anion is not part of the monolysinate compound 600, but rather remains as a residue 601 in the reaction solution.

The structural formula 600 shows the structure obtained for example according to embodiments of the process according to the invention when potassium sulfate ($K_2SO_4$) is used as the metal salt.

Figure 7:
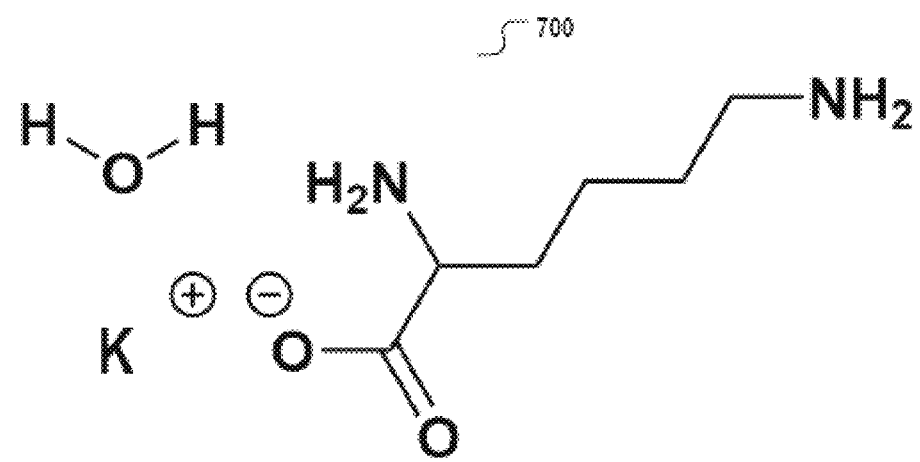
FIG. 7 shows a specific example of a monolysinate compound according to the general formula of FIG. 6.

FIG. 7 shows a specific example of a monolysinate compound according to the general formula 600 of FIG. 6, namely a structural formula for potassium monolysinate 700. The monolysinate compound 700 may contain water of crystallization (water of hydration).

Figure 8:
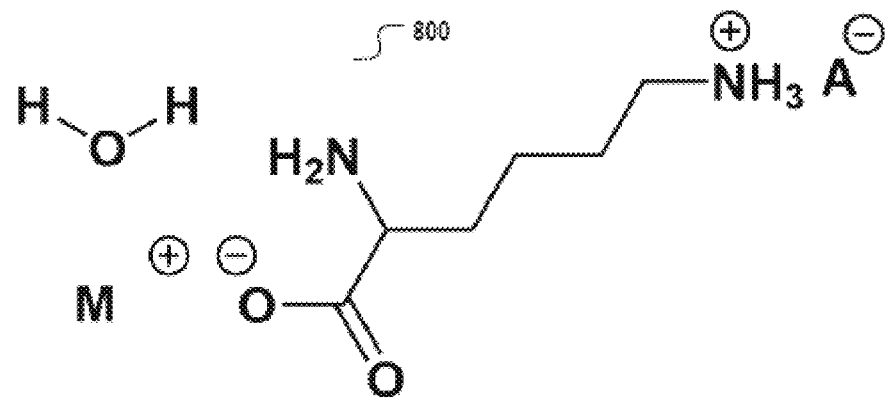
FIG. 8 shows a general structural formula of a further monolysinate compound.

FIG. 8 shows a general structural formula of a monolysinate compound 800, as can be obtained according to embodiments of the preparation process described here. The monolysinate compound 800 contains exactly one lysine molecule per metal atom. It is produced from an aqueous solution of lysine and a metal salt, the metal salt consisting for example of one monovalent metal atom and one monovalent anion (for example chloride ion). The compound 800, 900 may contain water of crystallization. The lysine molecule is bonded by its singly negatively charged carboxyl group to the singly positively charged metal ion via an ionic bond.

Figure 9:
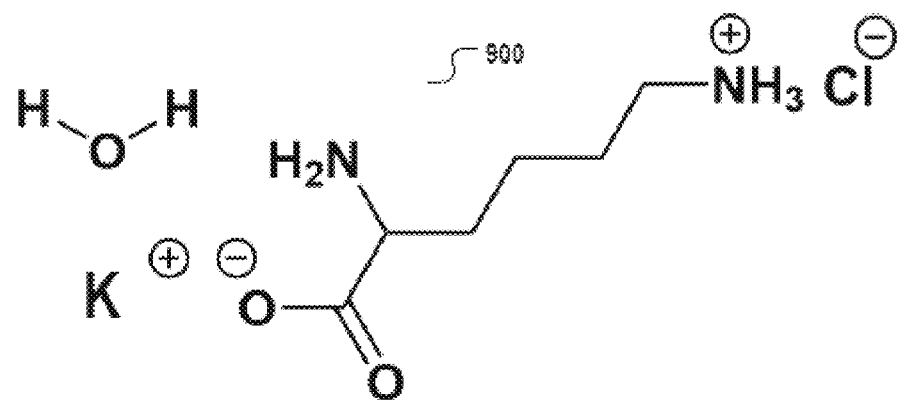
FIG. 9 shows a specific example of a monolysinate compound according to the general formula of FIG. 8.

FIG. 9 shows a specific example of a monolysinate compound according to the general formula 800 of FIG. 8, namely a structural formula for potassium chloride monolysinate 900. The monolysinate compound 900 may contain water of crystallization (water of hydration).

The free electron pair on the nitrogen atom of the amine group of the lysine residue may accept a proton, as shown by way of example for FIG. 8.

The monolysinate compound according to embodiments of the invention may be in the form of a monomer or in the form of a polymer comprising a plurality of said monomers. The compound may also be in the form of a mixture of monomer and polymer. By way of example, the monomers may be formed from a compound according to the formula specified in one of FIGS. 2-9. The formation of polymeric lysinate salts may be advantageous since in this way a homogeneous salt crystal lattice and a dense packing of the lysinate salt monomers can be achieved.

In some embodiments, the metal salt that will be added to the aqueous lysine solution may also contain water of hydration.

Figure 10:
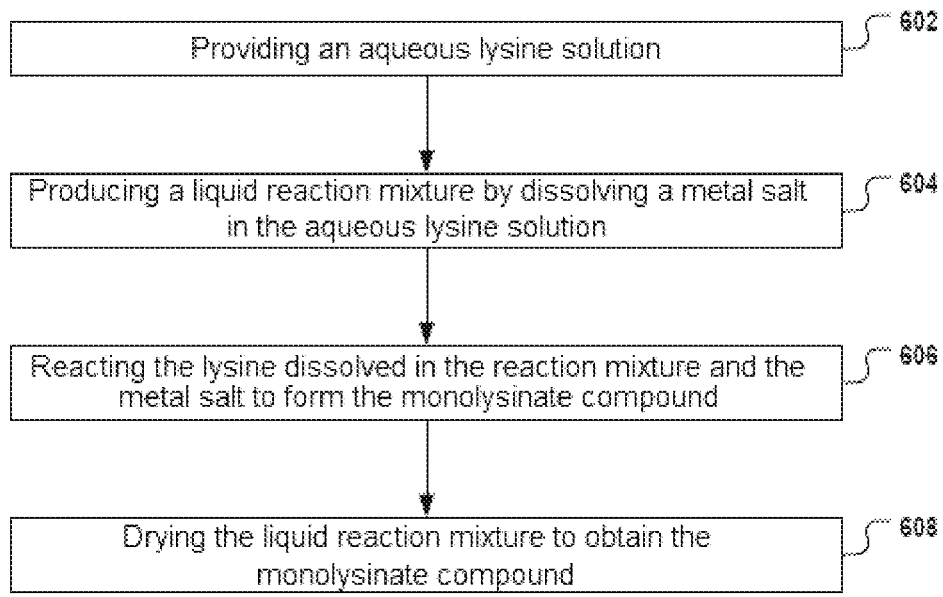
FIG. 10 shows a flowchart of a process for preparing a monolysinate compound as shown for example in FIG. 1.

FIG. 10 is a flowchart of a process for preparing a monolysinate compound 200, 300, 400, 500, 600, 700, 800, 900 as shown for example in FIGS. 2-9.

In a first step 602, an aqueous lysine solution is provided. By way of example, the aqueous lysine solution may be obtained from commercial suppliers. By way of example, aqueous lysine solutions having a lysine content of approximately 50% by weight are available on the market. The aqueous lysine solution has a dark-brown color and an alkaline to slightly alkaline pH. Solutions having such a pH do not corrode or barely corrode steel containers. Aqueous lysine solutions are dissolved in a manner that remains stable over a long period of time and are capable of being stored, for example in plastic or steel tanks. According to some embodiments, it is possible to prepare the aqueous lysine solution by oneself by dissolving the desired quantity of lysine in water or an aqueous metal salt solution. However, the use of an already prepared aqueous lysine solution (without metal salt) saves time since such solutions can already be obtained in ready-made form on the market.

In particular, the aqueous lysine solution used should be free of chlorides and Cl⁻ ions and other substances that could corrode steel containers or equipment. This prevents corrosion of the plant, which is undesirable not only with regard to the service life of the plant, but also with regard to the quality of the monolysinate compound to be obtained: in wet chemical processes for forming chelates, which are used in the prior art and in which hydrochloric acid or salts thereof are contained in the reaction mixture, it has been observed that the corrosion of the plant caused by the hydrochloric acid leads to the release of steel stabilizers such as chromium and other heavy metals. The heavy metals released as a result of corrosion may in turn react in an undefined manner with the metal salts dissolved in the reaction solution and may form compounds which are contained in the end product as impurities. Dry processes use mills or other forms of mechanical activation and lead to contamination caused by abrasion of material. Particularly in the context of using the monolysinate compounds as a feed additive, as a food supplement and/or as a plant fertilizer, the introduction of heavy metals such as chromium into the end product is highly undesirable. Many heavy metals are harmful to health and therefore should not be introduced into the metabolism of animals and humans or into arable land. The use of an aqueous lysine solution to prepare monolysinates is therefore not only cost-effective, but also particularly healthy and environmentally friendly since corrosion processes and the associated introduction of undesired heavy metals into the reaction solution are avoided.

The provided liquid lysine solution is preferably a lysine solution permitted under feed and/or food legislation.

In an optional step, additional water may be added to the provided aqueous lysine solution in order to dilute the solution. Particularly if the lysine solution is obtained commercially, the concentration may have to be reduced in order to increase the solubility of the metal salts and/or to ensure easy atomization of the reaction solution in a subsequent drying process. It is also possible to add this additional water, if necessary, before, during or after the dissolution of the metal salts in the aqueous lysine solution.

In a further step 604, a liquid reaction mixture is produced by dissolving a metal salt in the aqueous lysine solution. By way of example, the salt may be added to the lysine solution with constant stirring. By dissolving the metal salt, for example a sulfate, heat is released, as a result of which the prepared solution itself heats up. The metal salt dissolves somewhat more quickly at elevated temperatures. According to embodiments, the temperature of the aqueous lysine solution and/or the liquid reaction mixture is actively increased by heating, for example to a temperature above 30° C., for example above 50° C., furthermore for example above 60° C. The reaction is preferably carried out without active heating in order to save energy, so that the temperature of the reaction mixture increases to approximately 5-15° C. above room temperature during the dissolution.

The metal salt is preferably added in a molar ratio of metal atom M:lysine of 1:1. The quantity of metal salt required depends on the type of metal salt used and the concentration of the lysine solution.

By way of example, the liquid reaction mixture may comprise or consist of the following components in order to obtain approximately 1 kg of manganese monolysinate:

570 g manganese sulfate monohydrate (57%)
980 g aqueous lysine solution having a lysine content of 50% by weight
700 g additional water.

According to a further example, the liquid reaction mixture may comprise or consist of the following components in order to obtain approximately 1 kg of iron monolysinate:

570 g iron sulfate monohydrate (57%)
980 g aqueous lysine solution having a lysine content of 50% by weight
700 g additional water.

By way of example, M may represent manganese $Mn^{2+}$, iron $Fe^{2+}$, zinc $Zn^{2+}$, copper $Cu^{2+}$, calcium $Ca^{2+}$, magnesium $Mg^{2+}$, cobalt $Co^{2+}$, sodium $Na^+$, potassium $K^+$ or nickel $Ni^{2+}$. By way of example, A may represent a sulfate group $SO_4^{2-}$, a hydroxide group or a carbonate group $CO_3^{2-}$. In the case of monovalent metals, the stoichiometry must be adjusted accordingly.

The chemical reaction of lysine and metal salt to form a monolysinate compound is given by way of example in the following reaction equation for manganese sulfate:

$$MnSO_4 + C_6H_{14}N_2O_2 \rightarrow [MnC_6H_{13}N_2O_2]HSO_4$$

The corresponding reaction equation for preparing iron monolysinate is as follows:

$$FeSO_4 + C_6H_{14}N_2O_2 \rightarrow [FeC_6H_{13}N_2O_2]HSO_4$$

The generalized formula is as follows:

$$MA + C_6H_{14}N_2O_2 \rightarrow [MC_6H_{13}N_2O_2]HA$$

Here, M represents the metal of the metal salt and A represents the non-metal part of the metal salt. If the charge ratios in the metal salt are taken into account, M represents the metal cation and A represents the corresponding anion.

In a next step 606, a chemical reaction takes place between the lysine dissolved in the reaction mixture and the metal salt, so that the monolysinate compound is produced. For this, the dissolved lysine is reacted with the metal salt at temperatures of preferably above 60° C. with constant stirring and is converted into an ionic monolysinate metal salt compound. The stirring process is preferably continued until the starting materials of the reaction mixture have been fully reacted to form the monolysinate compound or until the chemical equilibrium is reached, so that no further increase in the concentration of the monolysinate compound is to be expected. Typically, a period of 20-60 minutes, in particular approximately 25-35 minutes is required for this. As an alternative to stirring, other forms of mechanical mixing of the liquid reaction mixture can also be used, for example shaking, turbulence by means of nozzles, repeated transfer of the liquid mixture into other containers, or the like.

The monolysinate compound resulting from a reaction mixture according to another embodiment of the invention, namely $[FeC_6H_{13}N_2O_2]HSO_4$, consists of 17.60% by weight iron, 30.61% by weight sulfate and 46.10% by weight lysine. The end product, the iron lysinate complex, contains approximately 5% to at most 10% (percent by weight) water. In the end product, the ratio of percent by weight of lysine to percent by weight of iron is 1:2.619.

Preferred quantity ratios of metal sulfate and lysine solution according to embodiments of the invention can be calculated from the table below for a number of different metal sulfates and depends on the concentration of the lysine solution used. The lysine solution may for example have a lysine content of 50% by weight. The quantities of lysine solution and metal salt are preferably selected such that there is an equimolar ratio of lysine molecules:metal atoms of the metal salt (hereinafter referred to in the tables as an "equimolar mixture") in the finished reaction solution. It is possible to bring the lysine and the metal salt into solution in other molar ratios in order to prepare the reaction mixture, for example in a molar ratio of 1:1.20 or 1:0.80 instead of a molar ratio of 1:1. However, the reaction products are preferably brought into solution in the ratio below since this means that only a very small stoichiometric residue of starting materials, if any, remains in the reaction solution.

| Metal sulfate: | Liquid lysine:water containing 50% by weight lysine | Metal sulfate [g/mol]: | Liquid lysine [g/mol] | Weight ratio for an equi-molar mixture |
|---|---|---|---|---|
| Manganese sulfate: | liquid lysine | 151.00: | 290.19 | 1:1.92 |
| Iron hydride tetrahydrate: | liquid lysine | 198.3: | 290.19 | 1:1.46 |
| Iron carbonate: | liquid lysine | 115.85: | 290.19 | 1:2.50 |
| Iron sulfate: | liquid lysine | 151.91: | 290.19 | 1:1.91 |
| Zinc sulfate: | liquid lysine | 161.45: | 290.19 | 1:1.80 |
| Copper sulfate: | liquid lysine | 156.61: | 290.19 | 1:1.85 |
| Copper sulfate monohydrate: | liquid lysine | 174.61: | 290.19 | 1:1.66 |
| Copper sulfate pentahydrate: | liquid lysine | 249.69: | 290.19 | 1:1.16 |
| Magnesium sulfate: | liquid lysine | 120.37: | 290.19 | 1:2.41 |
| Calcium sulfate: | liquid lysine | 136.11: | 290.19 | 1:2.13 |
| Sodium sulfate: | liquid lysine | 142.04: | 290.19 | 1:2.04 |
| Nickel sulfate: | liquid lysine | 154.76: | 290.19 | 1:1.88 |
| Potassium chloride: | liquid lysine | 74.55 | 290.19 | 1:3.89 |
| Potassium sulfate: | liquid lysine | 174.26: | 290.19 | 1:1.83 |

The molecular weight of 290.19 g/mol is a value calculated for a 50% lysine solution, which is calculated as follows: 1000 g of a pure aqueous 50% lysine solution contain 500 g of lysine, which has a molecular weight of 146.19 g/mol, and 500 g of water, which has a molecular weight of 18.015 g/mol. Therefore, 1000 g of liquid lysine contain 500 g/146.19 g/mol=3.42 mol of lysine and 500 g/18.015 g/mol=27.7 mol of water. The molar ratio of lysine:H2O is therefore 3.42 mol:27.7 mol=1:8.11. This 50% lysine solution therefore contains approximately 8 mol of water per mole of lysine. The hypothetically calculated molecular weight of a 50% aqueous lysine solution is therefore 146.19 g/mol+8.11×18.015 g/mol=292.3 g/mol. The table above gives a mathematically rounded value of 290.19 g/mol, which is obtained when starting from 8 mol of H2O per mole of lysine with a molecular weight of water of around 18 g/mol. If a lysine solution of a different concentration is used, the calculated "hypothetical" molecular weight of liquid lysine in the above table must be adjusted accordingly.

To prepare manganese sulfate monolysinate, therefore, 1 part by weight of the abovementioned 50% lysine solution is combined with 1.92 parts of manganese sulfate, for example by bringing these 1.92 parts of manganese sulfate into solution in the one part of the lysine solution. The metal salt quantities are calculated in an analogous manner for other metal salts.

According to further embodiments, different magnesium salts are used to prepare a magnesium salt monolysinate. The table below gives weight ratios for preparing different magnesium lysinates:

| MAGNESIUM SALT : | Liquid lysine: water with a lysine content of 50% by weight | MAG-NESIUM SALT [G/MOL] | Liquid lysine [g/mol] | Weight ratio for an equimolar mixture |
|---|---|---|---|---|
| Magnesium sulfate: | liquid lysine | 120.37: | 290.19 | 1:2.41 |
| Magnesium sulfate heptahydrate: | liquid lysine | 246.48: | 290.19 | 1:1.18 |
| Magnesium carbonate: | liquid lysine | 84.31: | 290.19 | 1:3.44 |
| Magnesium carbonate monohydrate: | liquid lysine | 102.32: | 290.19 | 1:2.84 |
| Magnesium carbonate dihydrate: | liquid lysine | 120.34: | 290.19 | 1:2.41 |
| Magnesium carbonate trihydrate: | liquid lysine | 138.35: | 290.19 | 1:2.10 |
| Magnesium carbonate pentahydrate: | liquid lysine | 210.40: | 290.19 | 1:1.38 |
| Magnesium hydroxide: | liquid lysine | 58.33: | 290.19 | 1:4.97 |
| Magnesium chloride: | liquid lysine | 95.21 : | 290.19 | 1:3.05 |
| Magnesium chloride hexahydrate: | liquid lysine | 203.30 : | 290.19 | 1:1.43 |

It can be seen from the table above that some metal salts are in the form of hydrates. In this case, the water of hydration content must be taken into account when calculating the weight or the quantity of the metal salt to be dissolved. The effect of water of hydration on the mixing ratios of the liquid lysine and the respective metal salt is indicated by way of example for magnesium salts in the table above. The table below contains corresponding weight ratios for calcium salts.

To prepare boron monolysinates, it is possible for example to use boron carbonate or boron sulfate as the metal salt. To obtain sodium monolysinates, besides sodium sulfate it is also possible to use for example sodium carbonate or sodium carbonate monohydrate or sodium carbonate decahydrate as the metal salt. The tables above are therefore to be understood merely as examples.

Once the starting materials have fully reacted to form the monolysinate compound, or once the chemical reaction equilibrium has been reached, the liquid reaction mixture is dried in a further step 608 in order to obtain the reaction product contained therein, the monolysinate compound.

By way of example, the drying may be carried out by means of spray drying (also atomization drying). In the case of spray drying, the fully reacted or equilibrated reaction mixture is introduced by means of an atomizer into a stream of hot gas, which dries the reaction product contained in the mixture to a fine powder within a very short time (a few seconds to fractions of a second). By way of example, the reaction mixture to be dried is atomized by means of a pressure atomizer (typically 50 to 250 bar depending on the model), a pneumatic atomizer (typically 1 to 10 bar depending on the model) or a rotary atomizer (typically 4000 to 50,000 l/min depending on the model). The total surface area of the liquid is hugely increased in size as a result. The atomized reaction mixture is sprayed into a stream of hot gas, as a result of which, due to the large surface area, the liquid evaporates within a very short period of time and the wet material dries to form a fine powder. Since the energy for the evaporation is provided by the hot gas, spray drying

| Calcium salt: | LIQUID LYSINE: WATER WITH A LYSINE CONTENT OF 50% BY WEIGHT | Calcium salt [g/mol] | LIQUID LYSINE [G/MOL] | WEIGHT RATIO FOR AN EQUIMOLAR MIXTURE |
|---|---|---|---|---|
| Calcium sulfate: | liquid lysine | 136.11: | 290.19 | 1:2.13 |
| Calcium sulfate hemihydrate: | liquid lysine | 145.15: | 290.19 | 1:2.00 |
| Calcium sulfate dihydrate: | liquid lysine | 172.17: | 290.19 | 1:1.69 |
| Calcium sulfate hydrate: | liquid lysine | 154.16: | 290.19 | 1:1.88 |
| Calcium carbonate: | liquid lysine | 100.09: | 290.19 | 1:2.90 |
| Calcium hydroxide: | liquid lysine | 74.10: | 290.19 | 1:3.92 |
| Calcium chloride: | liquid lysine | 110.98: | 290.19 | 1:2.61 |
| Calcium chloride dihydrate: | liquid lysine | 147.02: | 290.19 | 1:1.97 |
| Calcium hydride Tetrahydrate: | liquid lysine | 183.04: | 290.19 | 1:1.59 |
| Calcium hydride hexahydrate: | liquid lysine | 219.08: | 290.19 | 1:1.32 | is a so-called convection drying process. The hot gas is preferably air. However, the use of inert gases is also possible.

The inlet temperature of the hot gas lies in the range of 150-200° C., in particular in the range of 170-190° C. The feed temperature of the fully reacted reaction mixture, a dark-brown solution, preferably lies in the range of 60-80° C. The spray pressure preferably lies in the range from 2.0 to 3 bar, in particular 2.0 to 2.8 bar. The solids content of the sprayed, fully reacted reaction mixture is preferably approximately 40-60%, in particular approximately 45-52%.

The resulting dried material in powder form can then be separated off and collected. By way of example, a cyclone separator may separate from the air stream the monolysinate powder that has been produced by drying. The spray dryer may be operated either continuously or discontinuously.

The monolysinate powder particles obtained by spray drying typically have a diameter between 80 µm and 100 µm. According to one embodiment, more than 90%, preferably more than 95% of the monolysinate powder particles have a diameter between 80 µm and 100 µm.

According to some embodiments of the invention, the dried monolysinate powder particles are agglomerated to form granules in order to improve the powder properties (for example powder flowability, sinking behavior, tendency to create dust). For example, very fine monolysinate powder is fed back into the area of the atomizer in order to promote agglomeration there.

In some embodiments of the process, the step of drying the fully reacted reaction mixture is carried out in a separate step, which takes place before the step of producing granules from the powder obtained during drying.

In other embodiments, the monolysinate granules are produced in the course of drying. One example of this process variant is spray granulation, in which first, as in the case of pure spray drying, tiny dry particles are kept in suspension in a processing vessel ("fluidized bed"). The surface of these tiny particles serves as a crystallization nucleus for further small droplets generated by the atomization. In the spray granulation process, therefore, drying and granulation take place in a common process step, which makes it possible to monitor the particle growth and thus also to monitor the particle size and in some cases also the surface structure thereof.

In the context of this invention, "granules" are a particulate substance, wherein the diameter of at least 95%, preferably at least 97% of the particles lies in the range between 100 µm and 800 µm. The granules preferably have a bulk density of 700-800 g/liter (iron monolysinate: approximately 750 g/l, manganese monolysinate: approximately 760-770 g/l) with a residual moisture content of less than 5%, for example a residual moisture content of 2-3%.

Processing the monolysinate powder to form granules has a number of advantages, such as for example the reduced tendency to create dust, improved ease of handling, better flowability, a reduced tendency to form clumps, and the advantage of easier metering, at least in embodiments in which the granules are "stretched" using fillers or additives in order thus to achieve a lower concentration of the monolysinate compound per unit volume.

In some applications, however, it is advantageous to expel the dried monolysinate powder directly and process it further since, due to the large specific surface area of the powder, the spray-dried powder dissolves more quickly in water than the corresponding granules.

The monolysinate compound produced using the process described here typically contains water of crystallization. By way of example, the monolysinate compound $[MnC_6H_{13}N_2O_2]HSO_4$ contains approximately 5% of its weight in water of crystallization.

The monolysinate compound obtained according to the process described here has the advantage that it is particularly pure, that is to say is largely free of impurities that are either already contained in the starting materials or are introduced in the course of processing. In particular, the introduction of heavy metals from corroded steel containers is avoided. The process is cost-effective and can be carried out in a short period of time since use can be made of aqueous lysine solutions that are already commercially available.

The monolysinate compound thus obtained may be used in a variety of ways: Lysine is one of the limiting amino acids and is used for the synthesis of nucleic acids, for metabolizing carbohydrates, and is important for producing antibodies, hormones and enzymes. In many organisms, in particular including livestock, lysine improves the nitrogen balance, increases the secretion of digestive enzymes, promotes the transport of calcium in the cells, and generally leads to a better state of health, to better digestion of food, and to improved performance. The physiological efficacy of the trace elements added to the feed can be increased by incorporating these trace elements (metals) in the monolysinate compound, so that overall fewer metal salts or metal compounds have to be added to the feed, thereby also reducing the ingress of corresponding metals into rivers and fields via animal excretions.

One field of use of the monolysinate compound described here according to embodiments of the invention is therefore the use thereof as a component of animal feed, for example as part of a trace element mixture which is used as a food supplement or feed supplement for livestock and pets.

The monolysinate compound may also be used as an ingredient in plant fertilizer. A number of positive effects of the monolysinate compound described here have been observed in plant fertilization, including an increase in the leaf absorption of trace elements such as iron, manganese, zinc, copper, calcium and magnesium. Lysine, which is taken up by a plant in the form of the monolysinate compound, strengthens the plant's immune system and stimulates chlorophyll synthesis.

Figure 11:
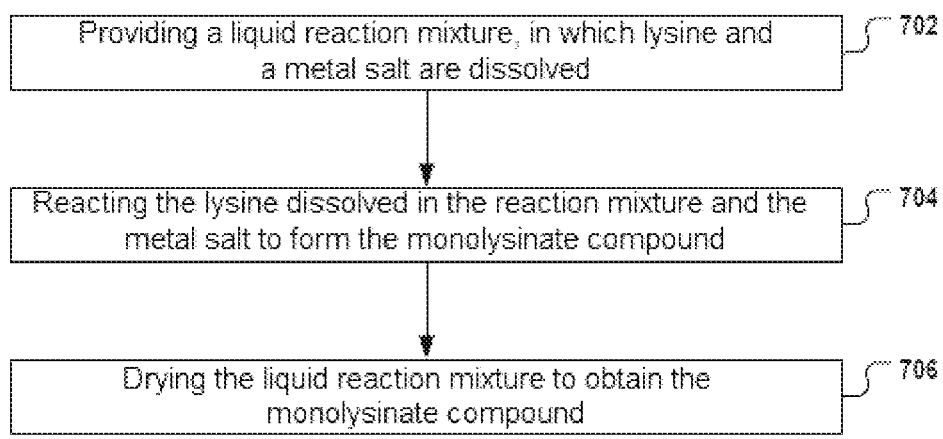
FIG. 11 shows a flowchart of a generalized process for preparing a monolysinate compound.

FIG. 11 shows a flowchart of a generalized process for preparing a monolysinate compound 200, 300, 400, 500, 600, 700, 800, 900 as shown for example in FIGS. 2-9. In step 702, the liquid reaction mixture already mentioned in the description of FIG. 10 is produced, it being left open as to whether, as shown in FIG. 10, first a liquid lysine solution is provided, in which the metal salt is then brought into solution, or whether first lysine is brought into solution in an aqueous solution, in which the metal salt is already dissolved in the desired quantity, or whether lysine and metal salt are brought into solution in water simultaneously. All these variants can be used to arrive at the liquid reaction mixture. The lysine and/or metal salt are preferably brought into solution at elevated temperatures of at least 30° C. since this accelerates the dissolution process. As already described, step 704 of chemically reacting the dissolved starting materials to form the monolysinate preferably takes place at temperatures in the range of 60° C.-90° C. with constant stirring over a period of typically 20-60 minutes, for example 25-35 minutes. The fully reacted solution can then be dried 706 to obtain the monolysinate, and may optionally also be granulated.

Figure 12:
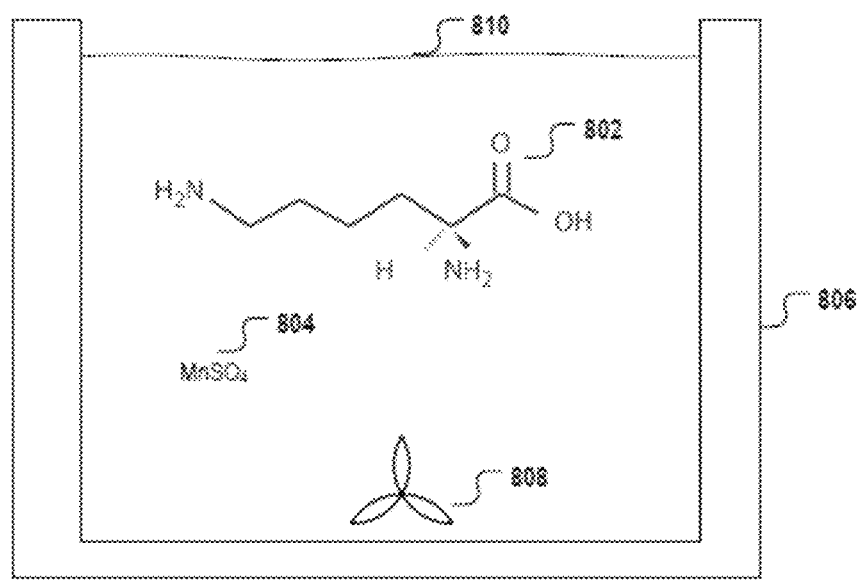
FIG. 12 shows a container containing a liquid reaction mixture.

FIG. 12 shows a schematic diagram of a container 806 containing a liquid reaction mixture 810, which is stirred for approximately 30 minutes at a temperature between 60 and 90° C. in order to cause the substances dissolved therein to react. The reaction mixture 810 is water in which on the one hand lysine 802 and on the other hand a metal salt, for example manganese sulfate 804, are dissolved. In the course of the dissolution process, the metal salt dissociates into positively charged metal ions and negatively charged anions, for example sulfate ions. In the course of the chemical reaction taking place in the reaction mixture, these starting materials are converted to a monolysinate compound 200, 300, 400, 500, 600, 700, 800, 900, as shown for example in FIGS. 2-9. The reaction container 806 may be, for example, a steel container having a stirring or other mixing device 808.

Figure 13A:
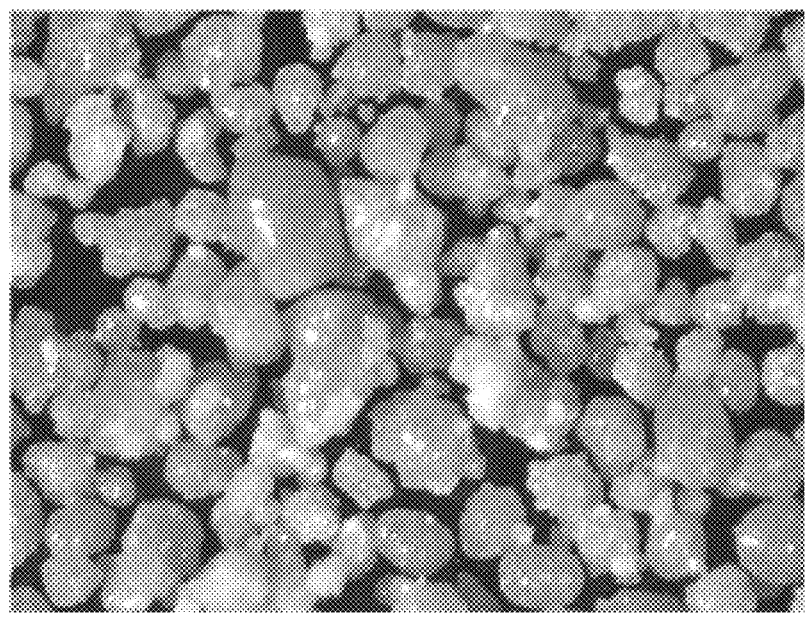
FIG. 13 shows photos of manganese monolysinate granules.
Figure 13B:
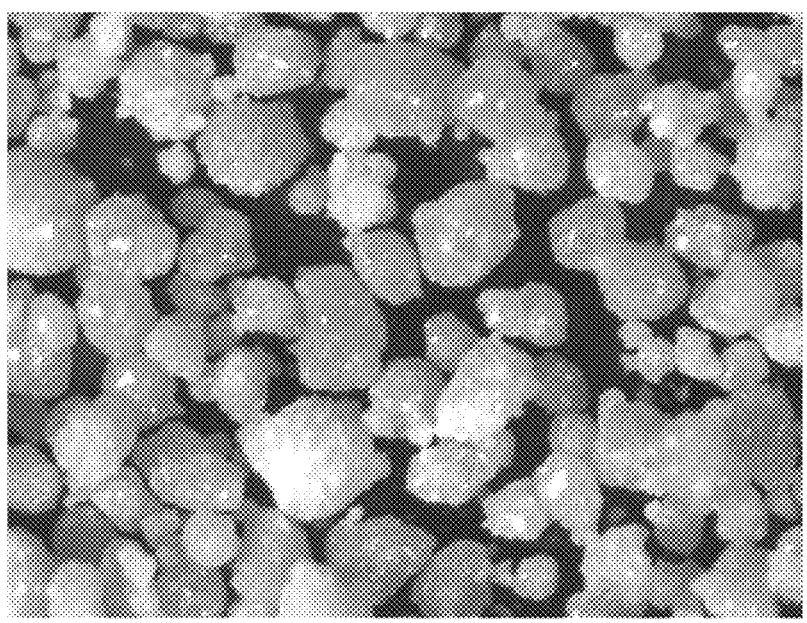

FIGS. 13A and 13B show photos of granules of a manganese monolysinate compound according to the formula [MnC$_6$H$_{13}$N$_2$O$_2$]HSO$_4$ that have been obtained by spray granulation, the manganese monolysinate compound being a hydrate.

Figure 14A:
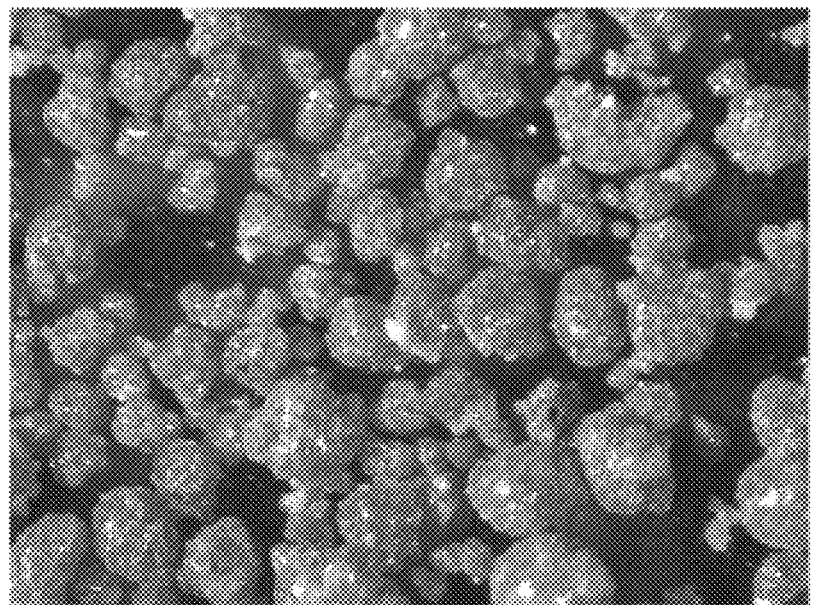
FIG. 14 shows photos of iron monolysinate granules.
Figure 14B:
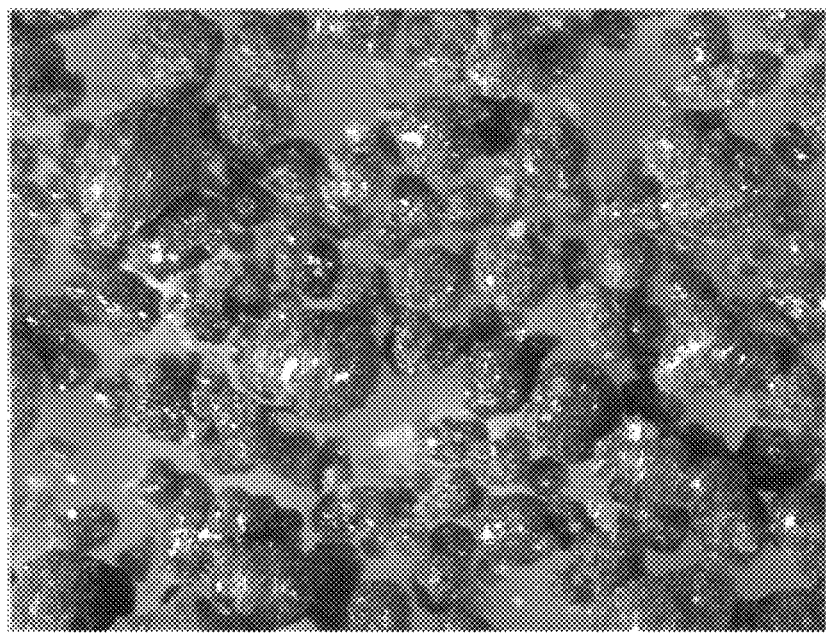

FIGS. 14A and 14B show photos of granules of an iron monolysinate compound according to the formula [FeC$_6$H$_{13}$N$_2$O$_2$]HSO$_4$ that have been obtained by spray granulation, the iron monolysinate compound being a hydrate.

Figure 15A:
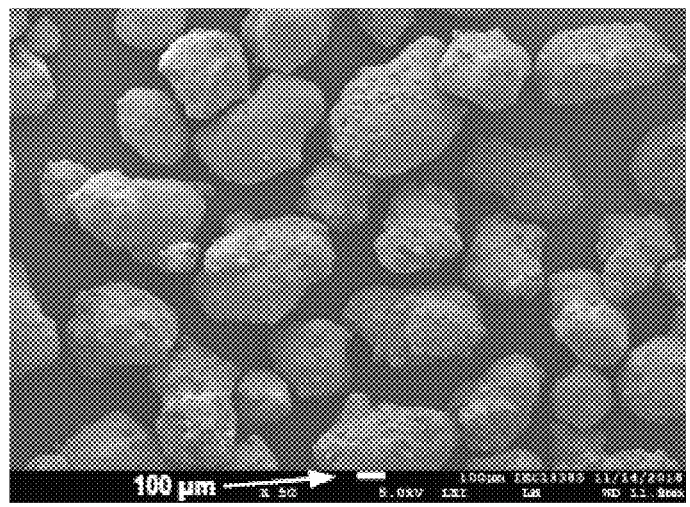
FIG. 15 shows electron micrographs of iron monolysinate sulfate.
Figure 15B:
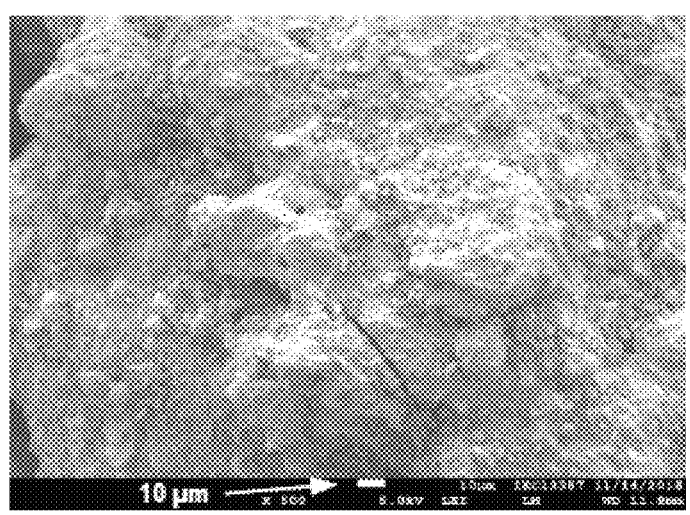
Figure 15C:
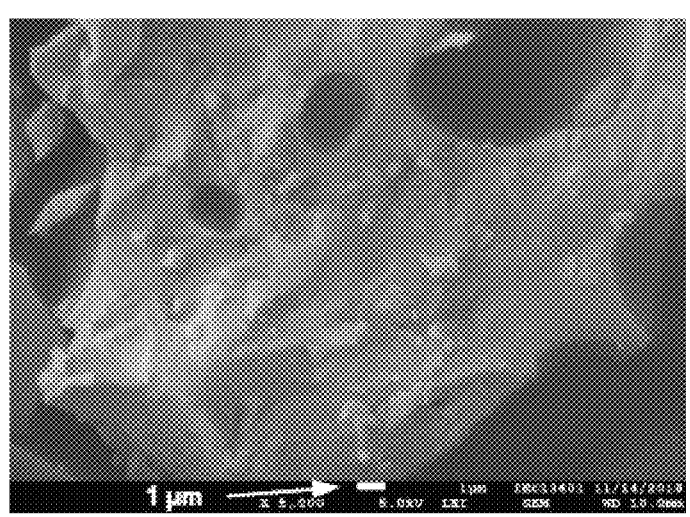

FIG. 15 shows electron micrographs of iron monolysinate sulfate granules at different resolutions. FIG. 15A contains, in the black image strip, a white horizontal bar, the length of which corresponds to 100 µm. The granular structure shown in this image depends heavily on the drying and/or granulation process selected in each case. The corresponding bar in FIG. 15B corresponds to 10 µm, and the one in FIG. 15C corresponds to 100 µm. In particular, FIG. 15C clearly shows the surface of the crystal structure of the iron monolysinate sulfate salt, which is fairly independent of the drying or granulation process selected. The surface exhibits numerous craters and round recesses, but also sharp and rather linear break lines.

Figure 16A:
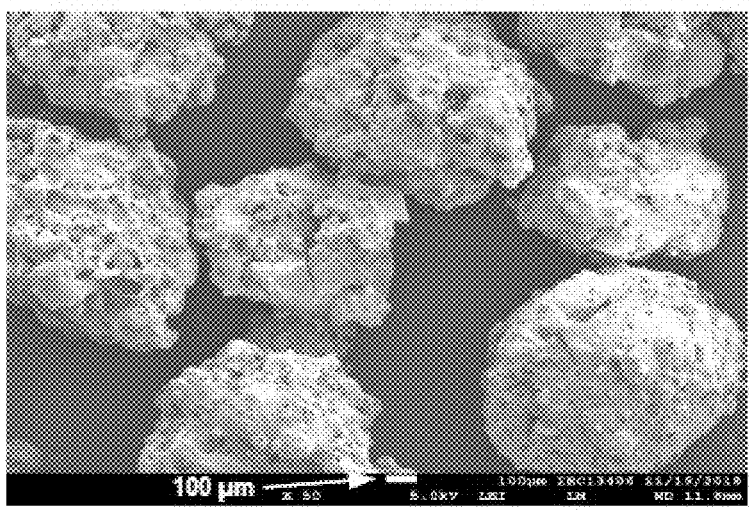
FIG. 16 shows electron micrographs of manganese monolysinate sulfate.
Figure 16B:
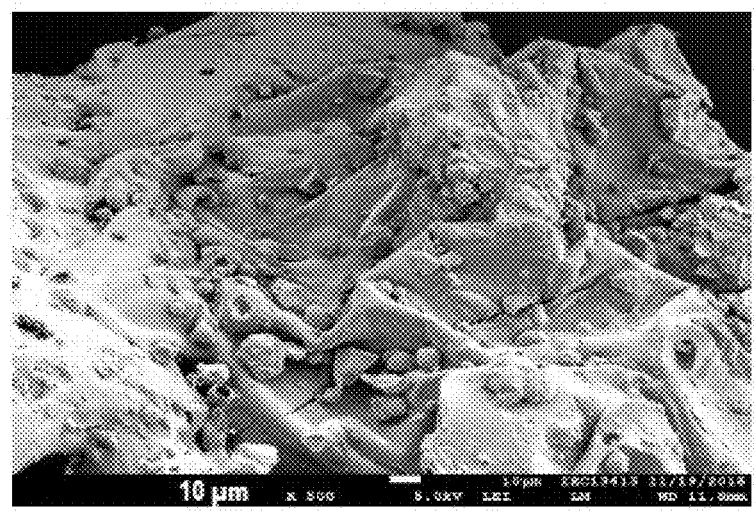
Figure 16C:
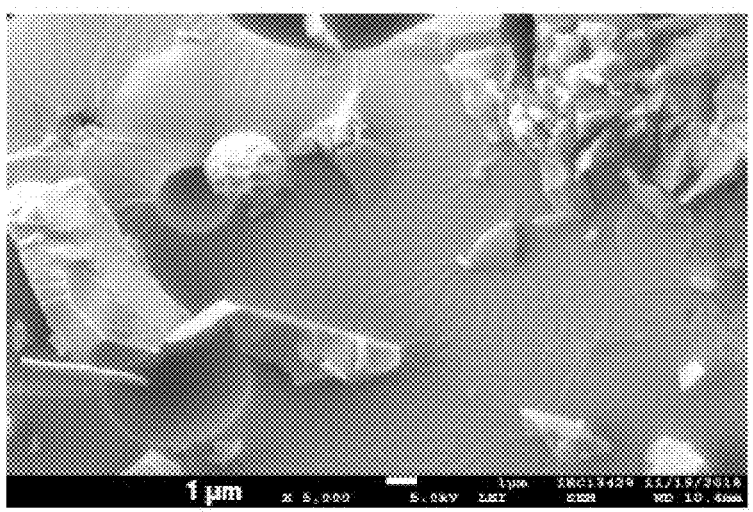

FIG. 16 shows electron micrographs of manganese monolysinate sulfate granules at different resolutions. FIG. 16A contains, in the black image strip, a white horizontal bar, the length of which corresponds to 100 µm. The corresponding bar in FIG. 16B corresponds to 10 µm, and the one in FIG. 16C corresponds to 100 µm. In particular, FIG. 16C clearly shows the surface of the crystal structure of the manganese monolysinate sulfate salt. The surface exhibits numerous craters and round recesses, but also sharp and rather linear break lines. Overall, the surface appears somewhat smoother than the surface of the iron lysinate salt in FIG. 15.

Figure 17:
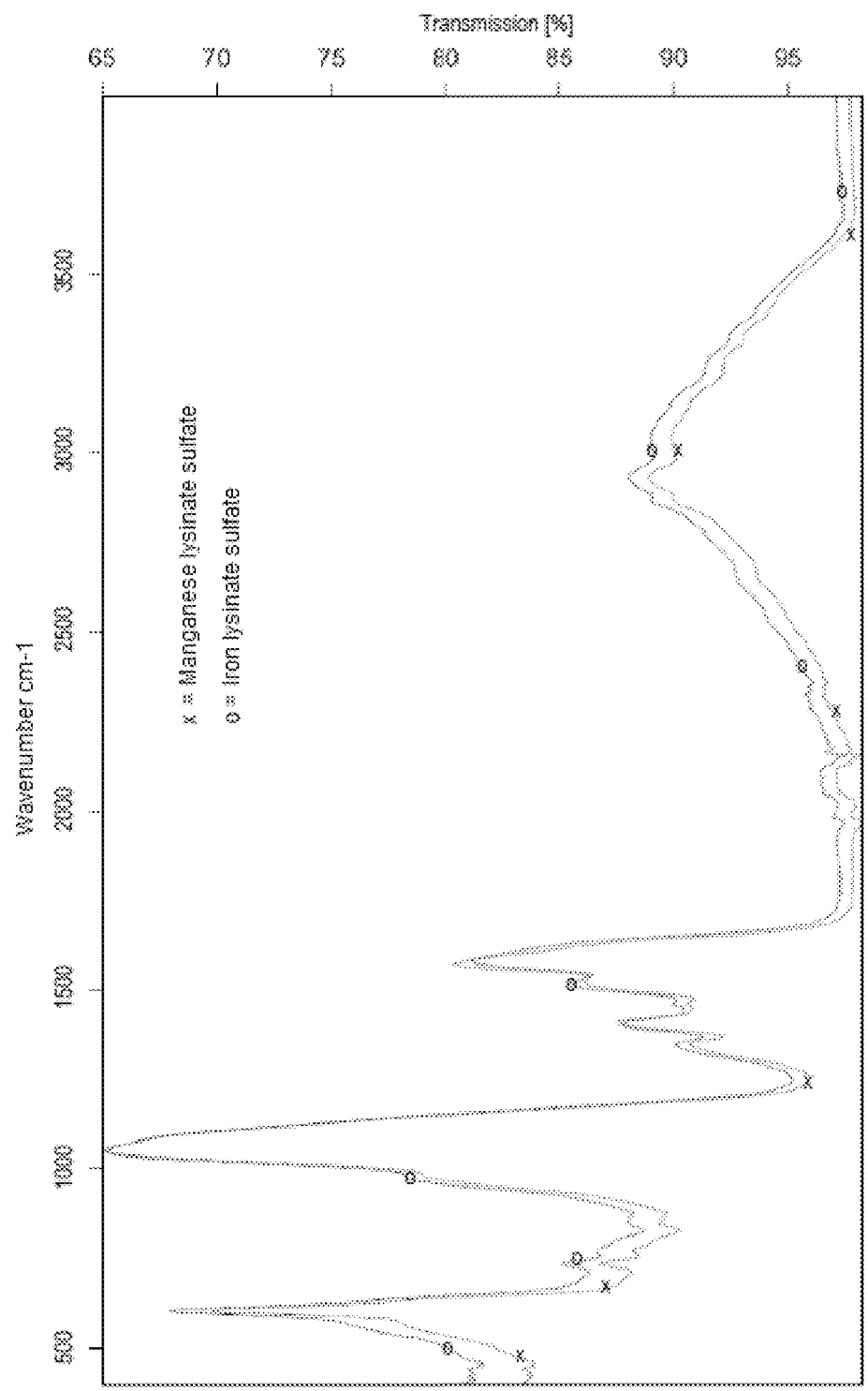
FIG. 17 shows an IR spectrum of two monolysinates.

FIG. 17 shows the results of an IR analysis of iron monolysinate and manganese monolysinate. The table below contains stoichiometric aspects of these compounds based on elemental analysis of the corresponding manganese compound. To characterize the composition, the ATR-IR technique was used to record infrared spectra from iron lysinate sulfate and manganese lysinate sulfate prepared by an embodiment of the process according to the invention. This procedure avoids any sample preparation and thus any associated undesired change in the analytes. Both IR spectra (manganese lysinate sulfate spectrum marked with an "x" in several places, iron lysinate sulfate spectrum marked with a circle in several places) are dominated by a band in the region of 1050 wavenumbers, which is typical for IR vibrations of the atoms oxygen and sulfur within a sulfate residue. This band is almost congruent for these two metal compounds. In the region around 1580 cm-1, the expected, characteristic carbon-oxygen stretching vibration $^\gamma_{C=O}$ is shown in the form of the carboxylate band of the amino acid lysine used. In the case of the iron compound, this vibration is shifted to a value of 1582 wavenumbers, while in the manganese counterpart it appears at 1575 cm-1. In addition, there are pronounced bands just below 3000 wavenumbers, which are typical for stretching vibrations $^\gamma_{C-H}C$ and are to be assigned here in particular to the four methylene units of lysine. Already from infrared spectroscopy, therefore, a metal lysinate sulfate can be seen to be the product actually present in each case. The metal itself can be determined by targeted analysis of the metal content (→LUFA). In contrast to similar known compounds with a chelate character, both products lack the typical bands shifted far into the high-energy region around 3500 cm-1, so that here there is no "chelate" in the true sense of the word, i.e. with coordinative bonding of the α-amino group to the metal cation, but instead classic salts of the amino acid with the metals have been formed with an ionic character.

For the manganese compound, an additional test was performed in order to ascertain whether the stoichiometric composition, which can be calculated from the detailed elemental analysis (not just C, H or C, H, N analysis with standard determination of the elements carbon, oxygen and nitrogen, but rather in the specific case with the addition of the sulfur and oxygen content), matches the values to be expected. The result can be seen in the table below.

| Element | Measured quantity [% by weight] | Calculated expected quantity for manganese sulfate mono lysinate (anhydrous), C6H14MnN2O65, 297.18 g/mol [% by weight] | Calculated expected quantity for manganese sulfate mono lysinate C6H16MnN2O7S, 315.20 g/mol (monohydrate) [% by weight] |
|---|---|---|---|
| C | 22.68 | 24.25 | 22.86 |
| H | 5.29 | 4.75 | 5.12 |
| Mn | 16.6 | 18.49 | 17.43 |
| N | 8.97 | 9.43 | 8.89 |
| O | 31.45 | 32.30 | 35.53 |
| S | 10.55 | 10.97 | 10.17 |
| Free water | 4.1 | | |
| Total sum | 99.64% | 100% | 100% |

The measured percentages by weight of the quantitatively determined elements carbon, hydrogen, nitrogen, oxygen and sulfur (CHNOS analysis), in conjunction with the LUFA metal analysis, show that a manganese sulfate monolysinate (synonym: manganese monolysinate sulfate) can in fact be inferred. However, this is not in anhydrous form, but rather is in the form of a monohydrate with one equivalent of water of crystallization (see right-hand column of the table).

The stoichiometric ratio, whereby one divalent metal cation forms a basic unit with one lysinate anion and a sulfate, does not necessarily indicate the monomeric character, that is to say a 1:1:1 compound (possibly plus water of crystallization). Instead, oligomeric structures based on a plurality of said basic units are in principle also conceivable, as shown for example in FIG. 8. In the case of an oligomeric monolysinate, the anions of the metal salt, that is to say for example the sulfate residues, may act as links (that is to say for example in the form of $SO_4^{2-}$ anions), whereas in the case of a monomeric structure a valence of the $SO_4^{2-}$ anion is saturated with a hydrogen atom or proton.

LIST OF REFERENCE SIGNS 100 structural formula of L-lysine
102 amino acid residue of the amino acid lysine 104 amino group of the amino acid lysine
106 carboxyl group of the amino acid lysine
200 general structural formula of a monolysinate compound
300 example of a monolysinate according to FIG. 2
400 general structural formula of a monolysinate compound
500 example of a monolysinate according to FIG. 4
600 general structural formula of a monolysinate compound
602-608 steps
700 example of a monolysinate according to FIG. 6
702-706 steps
800 general structural formula of a monolysinate compound
802 lysine molecule
804 manganese sulfate
806 reaction ratio
808 stirring device
810 liquid reaction mixture
900 example of a monolysinate according to FIG. 8

The invention claimed is:

1. A process for preparing a monolysinate compound, which comprises:
providing lysine to a metal container via an aqueous lysine solution having a lysine content of at least 30% by weight of the aqueous lysine solution and which is substantially free of chlorides and Cl-ions;
dissolving a metal salt in the aqueous lysine solution in a molar ratio of 1 mol of a metal atom of the metal salt to 1 mol of the lysine to produce a liquid reaction mixture such that corrosive effects originating from an interaction of the chlorides and the Cl-ions and the metal container are mitigated against and such that impurities resulting from the corrosive effects are mitigated against, the metal atom of the metal salt including $Mn^{2+}$, $Fe^{2+}$, $Zn^{2+}$, $Cu^{2+}$, $Ca^{2+}$, $Mg^{2+}$, $Co^{2+}$, $Na^+$ or $Ni^{2+}$, wherein the aqueous lysine solution and the liquid reaction mixture:
are free of further organic acids if the metal salt is not an iron salt; and/or
contain an organic acid if the metal salt is the iron salt;
reacting the lysine and the metal salt dissolved in the liquid reaction mixture to form the monolysinate compound such that exactly one lysine molecule is bonded to exactly one metal atom of the metal salt via an ionic bond; and
drying the liquid reaction mixture in order to obtain monolysinate powder particles including the monolysinate compound, the drying including spray drying the monolysinate compound such that a majority of the monolysinate powder particles have a diameter between 80 microns to 100 microns.

2. The process according to claim 1, wherein the monolysinate compound is a compound according to one of the following structural formulae a), b), c) or d), where M represents a metal cation of the metal salt and A represents an anion of the metal salt:

a)

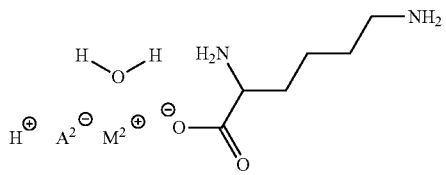

b)

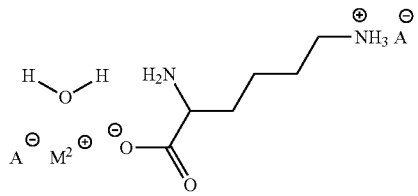

c)

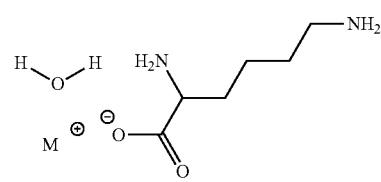

d)

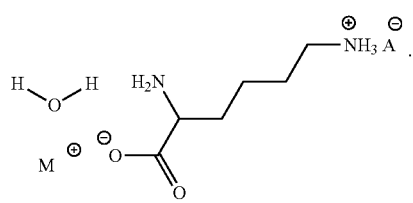

3. The process according to claim 1, wherein the metal salt is a metal sulfate, a metal hydroxide or a metal carbonate.

4. The process according to claim 1, wherein the monolysinate compound is a manganese monolysinate sulfate or an iron monolysinate sulfate.

5. The process according claim 1, wherein the metal salt is a zinc sulfate, iron sulfate or manganese sulfate.

6. The process according to claim 1, wherein the reacting comprises mechanically mixing the lysine and the dissolved metal salt at a temperature of at least 60° C. for at least 15 minutes.

7. The process according to claim 1, wherein the liquid reaction mixture:
has a pH of 8.0-8.3 and the metal salt is a manganese sulfate; or
has a pH of 6.4-6.8 and the metal salt is an iron sulfate; or
has a pH of 5.5-5.9 and the metal salt is a zinc sulfate; or
has a pH of 3.6-4.0 and the metal salt is a copper sulfate.

8. The process according to claim 1, which further comprises:
producing granules from the monolysinate compound after or during the drying.

9. The process according to claim 1, wherein the metal salt includes least one of the $Zn^{2+}$, the $Fe^{2+}$, or the $Mn^{2+}$.

10. The process according to claim 6, wherein the reacting the lysine and the metal salt is at a temperature between 60° C.-90° C.

11. The process according to claim 1, wherein the aqueous lysine solution has a lysine content of at least 40% by weight of the aqueous lysine solution.

12. The process according to claim 1, further comprising;
repeating the spray drying on at least a portion of the monolysinate powder particles to promote agglomeration of the monolysinate powder particles.

13. The process according to claim 1, further comprising;
diluting at least one of the aqueous lysine solution or the liquid reaction mixture with additional water prior to the spray drying.

* * * * *